Aug. 3, 1965  S. D. ROBINS  3,198,317
CONVEYOR APPARATUS
Filed July 13, 1962  2 Sheets-Sheet 1
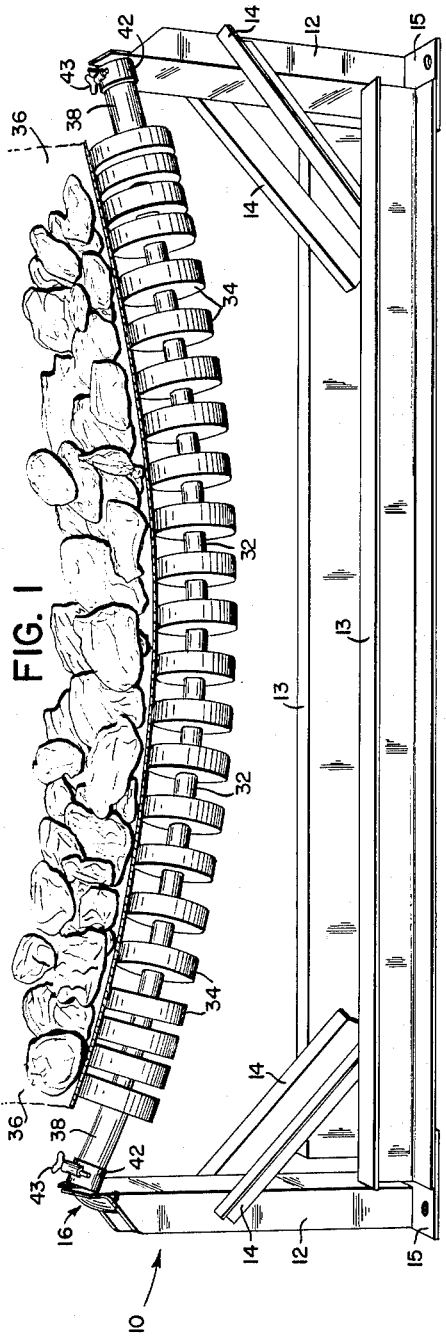
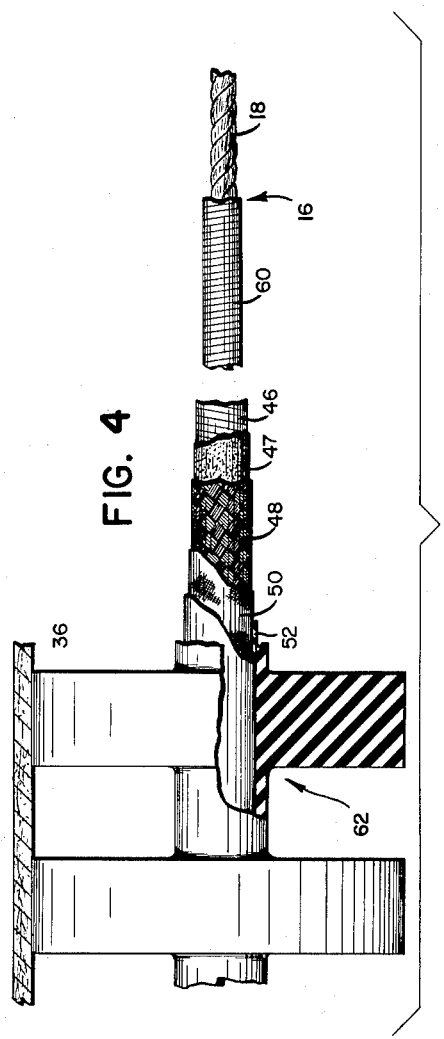
INVENTOR
SAMUEL DAVIS ROBINS
BY
Leonard H. King
ATTORNEY Aug. 3, 1965 S. D. ROBINS 3,198,317
CONVEYOR APPARATUS
Filed July 13, 1962 2 Sheets-Sheet 2

INVENTOR
SAMUEL DAVIS ROBINS
BY Leonard H. King
ATTORNEY

United States Patent Office 3,198,317
Patented Aug. 3, 1965

3,198,317
CONVEYOR APPARATUS
Samuel Davis Robins, 114 Berkshire Place,
Lawrence, N.Y.
Filed July 13, 1962, Ser. No. 209,648
8 Claims. (Cl. 198—192)

This invention relates to an improved catenary idler for the support of a conveyor belt in which the roll structure is suspended between fixed end supports. More particularly, it relates to idlers of the dead shaft type, its roll rotating about a stationary, non-rotating tension member in contrast with the commonly known live shaft type.

Briefly stated, this invention employs a flexible, fixed shaft member suspended between fixed end supports, and a flexible tubular member having spaced rollers of larger diameter fixed thereto. The tubular member concentrically envelopes the flexible fixed shaft and rotates thereabout.

It is an object of this invention to provide a novel idler structure characterized by low frictional drag.

It is still another object of this invention to provide an idler structure characterized by relatively low weight and manufacturing cost, and possessed of great strength and durability.

It is a further object of this invention to provide an improved idler structure having permanent lubrication means.

A still different object of the invention is to provide an idler employing simple means for protecting the bearing structure from attack of foreign materials.

Still a different object is to provide an improved idler structure not requiring ball or roller bearings.

A particular object of this invention is to provide an idler arrangement wherein the bearing length is continuous throughout the belt width.

Still a different object of this invention is to provide a structure in which the supporting shaft is not subject to bending stress and reacts in pure tension to an imposed load.

A still different object of this invention is to provide a structure having a large bearing length to diameter ratio.

Still a different object of this invention is to provide an idler structure employing a toroidal bearing.

A further object of this invention is to provide a roll structure which is easily adjusted to various trough depths.

A still further object of this invention is to provide a roll structure which permits the use of a standard conveyor belt for various types of loads.

These and still other objects, features and advantages of the present invention will, in part, be pointed out with particularity and will, in part, become obvious as the following description proceeds taken in conjunction with the accompanying drawing:

In the drawing:

FIG. 1 is a perspective showing of the idler of this invention.

FIG. 4 shows partially broken away an alternative embodiment of the invention.

Figure 2:
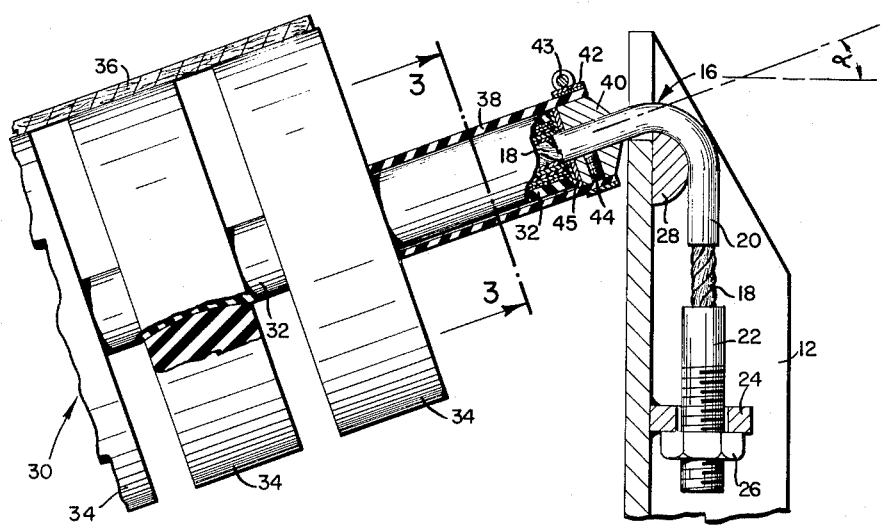
FIG. 2 is a typical full size detail partially broken away showing the mounting of the idler on the end support.

Referring to FIG. 1, there is shown a supporting frame 10. The frame, which may take a variety of forms to suit the particular type of conveyor structure may conveniently take the form illustrated. Vertical steel channels 12 and horizontal channels 13 are welded to base plate 15. Angle members 14 are welded to channels 12 and 13 to stiffen the structure. The top of the vertical channel 12 is notched (as shown in FIG. 2) to receive a non-rotating shaft 16 which serves as the stationary roll shaft. The shaft may be rigid for some applications, but in general a flexible catenary shaft is preferred. The flexible shaft may comprise a wire rope core 18 having a nylon coating or covering tube 20 throughout its journal portion. Its ends preferably terminate in threaded steel bushings 22 swaged to the rope. For anchorage, the bushing is slipped through an opening in flange 24 and secured by nuts 26. This provides means for adjusting the cable suspension. It will be noted that the cable seats against curved block 28, whose form allows for a better distribution of weight at a critical point. The curved form of block 28 allows flexible shaft 16 to slide easily by this point when the cable is adjusted.

At this point it can be seen that a mere adjustment of bushing 22 and nut 26 permits the roll structure to be shaped into a deeper or shallower trough as the type of load requires. Thus, the roll structure may be easily adjusted to allow it to accommodate various types of loads without having to utilize any special supporting structure, as most of the prior art conveyor belt structures required. In addition, it can be appreciated that the particular manner in which the adjustment is made, in combination with the dead shaft construction provides a smooth catenary which does not present any sharp angles that would lead to a higher rate of wear at those points.

The flexible roll assembly 30 is carried by flexible shaft 16. The assembly 30 consists of a tubular member 32 upon which a plurality of pulley members 34 are securely anchored throughout most of its length. The pulley members are closely spaced to adequately provide continuous support to the belt 36. The ends of central tubular member 32, that extend beyond pulley members 34 are encompassed by surrounding stationary resilient sealing sleeves 38 suitably secured to stationary bushings 40 by clamps 42 tightened by screw 43. The stationary bushings, in turn, are anchored to the central stationary shaft 16 by set screw 44 tightened against nylon tube 20. The tubular member 32 seats against thrust washers 45.

Since the ends of the rotating roll are elevated, the sealing sleeves 38 form inverted cups which prove to be extremely effective shields against foreign matter entering the end of the rotating roll. With this construction, it would be necessary for foreign matter to run uphill in order to enter the bore of the tube.

Further advantages derive from the U-tube configuration since lubricant once introduced between the journal surfaces cannot escape, the two entrances being higher than the rest of the journal. This makes for permanent perpetual lubrication.

The tubular member 32 is a hose-like structure comprising a spirally wound metal core 46, a concentric layer of a neoprene impregnated cloth casing 47 surrounded by wire braiding 48, concentric plies of fabric 50, and finally a tough rubber cover 52, all vulcanized in manufacture into a homogeneous flexible structure.

An important feature is the spirally wound wire core 46 of the rotating member, which because of its longitudinal flexibility can engage in journal fashion the stationary curved catenary shaft 16 within it. Whether the wire is of square or rectangular section is unimportant but in either case, it should have a flat face on the inner surface of the wound helix to develop maximum bearing area and the winding should be coil-to-coil for the same reason. The opposed bearing faces should be of unlike materials.

The casing 47 surrounding this helically wound wire core is preferably composed of neoprene or other oil resistant rubber compound for both flexibility and purposes of lubricant retention. For added strength, one or two plies of fabric are helpful, as in the construction of a common hose.

As the roll, in service, is at times subject to torsional stresses, and as it would be undesirable to have the bore of the helical journal change by being twisted, it has proved advantageous to incorporate braided wire 48 in the make-up of the reinforcement surrounding the helical wire core. Alternatively, a spirally wound light wire, wound counter to the inner core, may suffice. It is to be understood that the inner core with its surrounding fabric, wire, and neoprene or rubber cover, are cured or vulcanized into an elastic resilient homogeneous structure having great longitudinal flexibility but considerable torsional rigidity. Upon this hose-like member are securely mounted the discs, wheels, or tires that carry the conveyor belt. The pulley members 34 may be press fit onto member 32, as shown in FIG. 2, or molded together with covering 52 into a monolithic structure 62, as shown in FIG. 4.

The stationary flexible shaft 16 consists preferably of a wire rope core 18 surfaced with a low friction bearing material 20. This bearing material may be metallic or a slippery plastic such as nylon, Teflon and Kel-F or a plastic loaded with substances such as metal, glass, graphite, molybdenum disulphide, asbestos, etc., to impart abrasive resistance, low friction characteristics, heat resistance, or other desirable qualities. It may be directly bonded to the wire rope core, as by extrusion, or manufactured in tubular form, cut to appropriate lengths, and slipped over the wire rope core. It may take the form of a tape 60 wound onto the wire rope core, as shown in FIG. 4.

The conveyor support of this invention can be adapted to meet varying load situations. Some loads, such as wet sand require a belt with a deep trough, on the other hand loads such as dry sand require a belt whose shape is relatively flat.

With most prior devices when it was necessary to change over from one type of load requiring a deep trough to another type requiring a shallow trough an extensive, costly, and time consuming operation was involved. This operation consisted in not only changing the roll structure in some instances, but in addition the structural members supporting the roll structure had to be altered.

Furthermore, utilizing devices in the prior art, when deep troughs are required, cause the idler structure which supports the conveyor belt to form sharp angle bends in the conveyor belt. The flexing of the belt along the sharp bend resulted in extreme wear greatly reducing the life of the belt.

The present invention overcomes the aforementioned difficulties and other problems inherent in prior art roll structures by employing a flexible, fixed shaft member suspended between fixed end supports.

Figure 5:
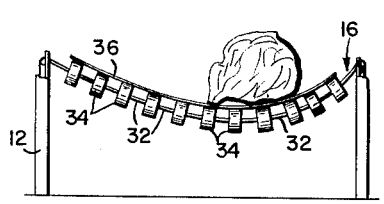
FIG. 5 is a vertical elevation with the end supports partially broken away showing the effect of an unbalanced load on the conveyor.
Figure 3:
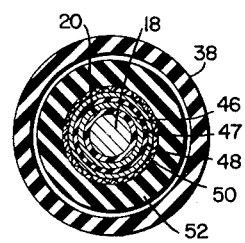
FIG. 3 is a cross-section taken along line 3—3 of FIG. 2.

Indicative of the ruggedness and shock absorbing capability of this invention is an installation of one such idler beneath a 42-inch wide conveyor belt in a large gravel pit where bank-run sand and gravel is being mined by a dragline bucket and dumped onto a sloping bar grizzly above a large feed hopper. Many small boulders measuring a cubic foot each and weighing over 100 lbs. fall through the grizzly into the hopper along with sand and gravel. A mechanical feeder discharging from the hopper provides a steady feed of 600 tons per hour to the aforementioned 42″ wide conveyor belt. The feeder's height above the belt is such that the stream drops four feet vertically onto the belt directly above the idler of this invention. The frequency with which 80 to 125 lb. boulders impact the idler is about 4 to 15 per minute throughout the eight-hour operating day. It will be appreciated that this type of service can result in severely unbalanced loads, as shown in FIG. 5. The structure of this invention is particularly well adapted to handling unbalanced loads. After months of service, the idler showed no sign of extreme wear or incipient failure.

In some types of service such as outlined above, where impacts of heavy lumps of material necessarily distort the cross section as shown in FIG. 5 flexibility of the shaft is desirable and necessary. In lighter duty applications however a degree of rigidity is preferable and a shaft composed of a metal rod bent to the catenary contour makes an advantageous substitute for the wire rope.

A principal object of the invention, as stated, is the achievement of very low overall friction in a belt supporting roll, thus reducing the required driving tension of the belt. In turn, this permits the use of a less expensive belt and also conserves power which consequently yields economies in motor and power transmission machinery as well as electric current. To this end, the advantage of employing a toroidal shaped journal arises from basic consideration of plain journals from two important standpoints—friction, and load capacity. It is well known that the friction of any plain journal, other factors being equal, is directly proportional to the diameter. Also, other factors being equal, capacity is proportional to the product PV, in which P is the unit pressure and V the rubbing velocity at the journal surface. Since P is "load" divided by "projected area" (length times diameter), it varies inversely as diameter. Also V, for a given rotational speed, again depends on diameter and varies directly with it. Thus the product PV is independent of diameter, for a change of diameter which would increase P would decrease V a corresponding amount. These considerations point up the fact that desirable low bearing friction can best be achieved simply by using small diameters with no sacrifice of capacity. But this is only true when journal length can be correspondingly increased to maintain an adequate projected area to carry the load with permissible pressure. In conventional journals a pulley having a rigid bushed bore must run on a rigid stationary shaft and it is found that journal length cannot usually exceed three times diameter without sacrificing shaft stiffness and leading to binding of the deflected shaft within the rigid bushing. It is here that the "toroidal" bearing with its flexible pulley journaled to its catenary tensioned shaft escapes the limitations of the conventional rigid journal. The flexible shaft, adjusts its catenary to the imposed load thus escaping bending stress and reacting in pure tension. The flexible pulley, mounted on the shaft, bending as it rotates, hugs the shaft with no binding. In this arrangement, the bearing length may be continuous throughout the pulley length and a length-to-diameter ratio of 100:1 or more instead of the typical 3:1 ratio is achievable. A ratio of at least 30:1 is desired.

A complete analysis of the friction of various types of idlers involves many factors both within the idler and without. For instance, the sag of the belt between idlers which depends upon the span, the tension and the weight of the belt with its load, affects the total idler drag. Thus no absolute and valid determination of idler friction is possible without the inclusion of many factors external to the idler structure. But for comparative purposes the following holds true. In a live shaft catenary idler the bearing thrust load in each of its two bearings is equal to the cable tension which in turn is the weight supported times the cosecant of the angle alpha (see FIG. 2). The cosecant of 20°, which is a typical normal angle, is about 3. Thus the total thrust load for two bearings is three times the weight supported. As the friction in the bearings is roughly proportional to the load this multiplication is disadvantageous. Comparing this condition to the dead shaft catenary idler of this invention, where no thrust bearings are needed for load support, the bearing friction is directly proportional to the load with no multiplication and as explained may be minimized by employment of small shaft diameter. Again in the live shaft type there is a friction loss within the rotating constantly flexing cable brought about by the rubbing against one another of its individual wires. No such loss can occur where the shaft is stationary.

A consideration of these facts explains why the structure of this invention achieves a low overall friction comparing favorably with idlers employing expensive ball or roller bearings.

As a result of the catenary configuration, a low point exists which forms a reservoir for lubricating oil injected between the fixed and rotating bearing surfaces.

Thus, a simpler, cheaper, stronger, and more friction free idler roll is achieved in this novel structure.

There has been disclosed heretofore the best embodiment of the invention presently contemplated and it is to be understood that various changes and modifications may be made by those skilled in the art without departing from the spirit of the invention.

What is claimed is:

1. An apparatus for use in combination with a conveyor framework provided with transversely spaced frame elements, said apparatus comprising: a nonrotating, flexible catenary shaft of uniform diameter for suspension between said frame elements; and a belt supporting tubular roll of flexible one-piece construction having a uniform inside diameter closely and concentrically spaced about said shaft throughout substantially the entire length of both said roll and said shaft, said roll being adapted to assume a catenary shape for accommodating the curved section of a troughed conveyor belt, said roll containing throughout its length a flexible bushing for journal engagement with said nonrotating catenary shaft, and a plurality of enlarged diameter disc portions integrally formed on said roll, said discs being positioned in spaced relation along substantially the entire length of said roll and wherein said bearing surface of said roll is formed of a first helically wound metal band wound in a clockwise direction and a second helically wound metal band wound concentrically with said first band in a counterclockwise direction.

2. The device of claim 1 including lubricant retaining means surrounding said second helically wound metal band.

3. The device of claim 2 wherein said lubricant retaining means comprises a nonporous, flexible casing covering said second helically wound metal band.

4. The device of claim 2 wherein there is further included a reinforcement member surrounding said lubricant retaining means.

5. The device of claim 4 wherein said reinforcement member comprises a sleeve of braided wire surrounding said lubricant retaining means.

6. The device of claim 4 wherein said reinforcement member comprises a length of wire wound spirally about said lubricant retaining means in a direction counter to said second helically wound metal band.

7. In a belt conveyor, in combination with a conveyor framework provided with transversely spaced frame elements:
  a catenary shaft secured to and suspended between the spaced frame elements in a manner preventing rotation of said shaft;
  a single continuous flexible sleeve concentrically surrounding said shaft and arrange to rotate thereabout, said sleeve having a uniform inside diameter dimensioned for a closely spaced and concentric fit about said shaft;
  a plurality of discs carried by said sleeve, for rotation therewith, said discs being of larger diameter than said sleeves and having an axis of rotation in common with the axis of its portion of said sleeve; and
  a helical flat wire fixed bearing surface covering said nonrotating shaft, said flexible sleeve further including an innermost layer comprising a helical flat wire rotating bearing surface adapted to slide on said fixed bearing surface.

8. The device of claim 7 wherein said catenary shaft is covered by a nylon sleeve.

References Cited by the Examiner

UNITED STATES PATENTS

| 2,562,949 | 8/51 | Robertson. |
| 2,887,203 | 5/59 | Baron _____ 198—192 X |
| 2,942,721 | 6/60 | Kidd et al. |

FOREIGN PATENTS

| 844,427 | 7/52 | Germany. |
| 833,698 | 4/60 | Great Britain. |

(Corresponding to German printed application No. 1,043,937.)

SAMUEL F. COLEMAN, *Primary Examiner.*

WILLIAM B. LABORDE, *Examiner.*